Sept. 21, 1937.  J. E. THOMAS  2,093,943

METAL PLATE LIVESTOCK BRAND

Filed June 10, 1937

Inventor
J. E. Thomas
By [signature]
Attorney

Patented Sept. 21, 1937

2,093,943

UNITED STATES PATENT OFFICE 2,093,943

METAL PLATE LIVESTOCK BRAND

John E. Thomas, Malad City, Idaho

Application June 10, 1937, Serial No. 147,565

6 Claims. (Cl. 40—3)

This invention relates to an improved identification marker for cattle or other livestock and is intended to replace the common method of branding livestock.

The object of the invention is to provide a marker for livestock which may be permanently secured to an animal without causing the animal as much suffering as the application of a brand; which is adapted to contain a plurality of identifying markers certain of which can be removed and replaced; and which can be removed from the animal when butchered and thereafter used again. This is accomplished by providing a marker a part of which is passed under the hide of the animal and provided with locking means at the free ends to secure the device in position. The front of the marker being provided with permanent identification means and also with identification tags removably secured thereto.

Other objects and advantages of the invention will hereafter become apparent from the following specification of which the drawing forms a part, and wherein:—

Figure 1:
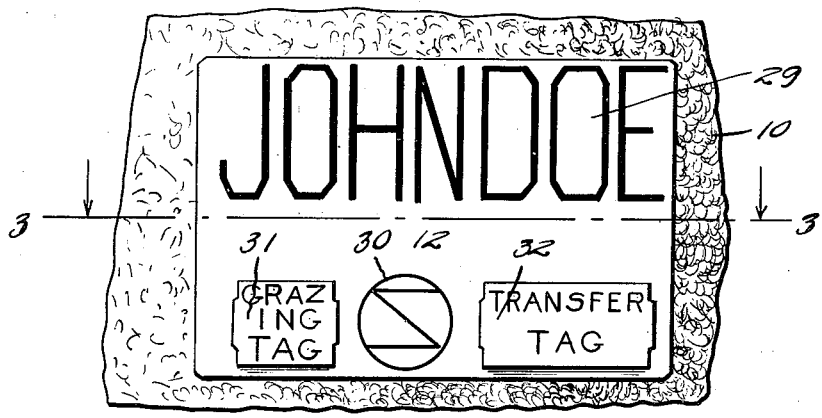
Figure 1 is a front elevational view of the invention.

Referring more particularly to the drawing wherein like reference characters designate like or corresponding parts in the different views, 10 designates the hide of an animal such as a cow, and 11 designates its flesh.

A plate 12 is provided with a reduced portion 13, forming a tongue, bent to extend across the back of plate 12 and formed integral with one end thereof. The opposite end of plate 12 is bent to form a housing 14 in which are mounted the sliding jaws 15 extending through an opening 16 in the housing 14. Each of the jaws 15 is provided with oppositely extending offset guide portions 17 adapted to slidably engage the inner side of the housing 14 to hold the jaws 15 in position. Between the jaws 15 and the sides of the housing 14 are mounted coil springs 18 adapted to urge the jaws 15 together.

The free end of tongue 13 is bent back upon itself at 19 and provided with an opening 20. Extending vertically across opening 20 is a triangular shaped bar 21 secured to the inner side of end 19.

Jaws 15 are provided with outwardly extending hooked shaped portions 22 having beveled ends. The hooked shaped portions 22 face each other to form a recess 23 therebetween shaped to engage bar 21. A seal 24 is adapted to cover the opening 20 and to be soldered or welded at 25 and riveted at 25' to prevent bar 21 being disconnected from jaws 15. Studs 26 extend from housing 14 and are adapted to engage openings 27 in the end 19 to form guides for the tongue 13.

The rolled edges of plate 12 are provided with notches 28 on the inner side thereof to permit the passage of air between plate 12 and the hide 10. The tongue 13, intermediate its ends is bent inwardly toward plate 12 causing the opposite ends of the tongue 13 to engage the hide 10 and to keep the tongue 13 away from the flesh 11.

Figure 2:
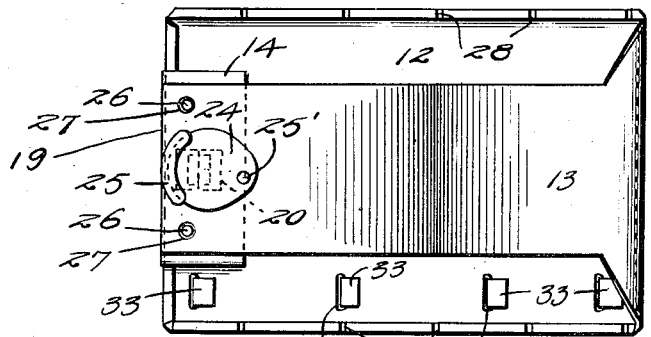
Figure 2 is a rear elevational view of the same.
Figure 3:
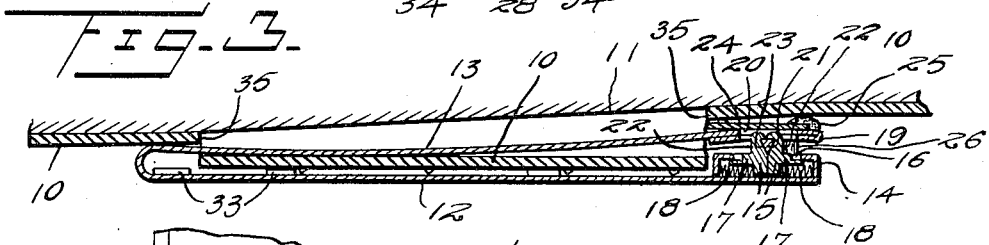
Figure 3 is a horizontal sectional view on the line 3—3 of Figure 1.
Figure 4:
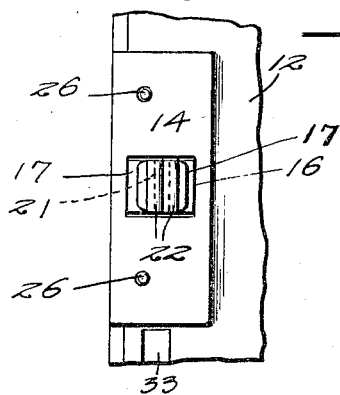
Figure 4 is an enlarged fragmentary view of the locking jaws and their housing.

The outer side of plate 12 is provided with a space 29 for the owner's name and address or other suitable identification. In the middle of plate 12 at the bottom is provided a space 30 for the animal's serial number; the marks 29 and 30 being permanent. At the bottom of plate 12 are also provided removable tags 31 and 32 having tongues 33 adapted to extend through openings 34 and to be bent at right angles, as seen in Figure 2, to secure tags 31 and 32 in position. Tag 31 is a grazing tag and 32 a transfer tag to signify a change in ownership of the animal. It is intended that when the animal is butchered plate 12 is to be removed by melting off seal 24 and releasing the tongue 13 from the jaws 15. Plate 12 can then be returned to the owner to be used again.

To apply, two incisions 35 approximately two inches long and four inches apart are made at any conspicuous place on the animal, preferably on the left hip. Tongue 13 is then inserted through one incision 35 and thence under hide 10 and out through the second incision. End 19 is then pressed toward plate 12 causing the edge of bar 21 to engage the beveled ends of jaws 15 to spread the jaws to permit bar 21 to enter recess 23 and to allow springs 18 to press jaws 15 into engagement therewith. Seal 24 riveted at 25' and soldered at 25 is secured over the opening 16 when the device is manufactured, so that when jaws 15 engage bar 21 the device is locked in position until seal 24 is removed so that jaws 15 can be spread to permit them being disengaged from the bar 21; thus preventing unauthorized removal of plate 12 without applying heat sufficient to burn the animal and have a tell-tale mark. The incisions 35 will not be nearly as painful as the old method of branding with heat and will heal more quickly.

It is understood that only the preferred embodiment of the invention has been shown and described, the right being reserved to make such changes as will not depart from the spirit and scope of the invention as claimed.

I claim as my invention:—

1. A cattle marker comprising a plate provided with spring pressed locking jaws, a tongue extending from one end of said plate and being bent to extend across the back thereof, said tongue being provided with a keeper to be engaged by said jaws, and a seal covering said jaws and keeper.

2. An identification marker comprising a plate provided with a plurality of openings, a plurality of tags each provided with tongues to engage the openings in said plate to removably secure said tags in position, a tongue formed integral with said plate and extending across the back thereof, said tongue adapted to be passed through spaced incisions in the hide of an animal, the free end of said tongue being provided with a keeper, and spring pressed locking jaws mounted in said plate and engaging said keeper to secure the device in position.

3. An identification marker for cattle comprising a plate provided with removable tags, a tongue formed integral with one end of said plate and extending across the back thereof, said tongue adapted to pass through the hide of an animal, a wedge shaped bar mounted adjacent the free end of said tongue, spring pressed jaws mounted in said plate to engage said bar, and a seal covering said bar and jaws to prevent removal of said marker.

4. A device as in claim 3, the edges of said plate being provided with spaced notches to permit the passage of air between said plate and the hide of the animal.

5. A device as in claim 3, the intermediate portion of said tongue being bent toward said plate to prevent said tongue from pressing against the flesh of the animal.

6. A cattle brand comprising a plate provided with a housing formed adjacent one end thereof, a tongue formed integral with the opposite end of said plate and bent to extend across the back thereof, a keeper secured to said tongue, and spring pressed locking jaws mounted in said housing and extending through an opening therein to engage said keeper.

JOHN E. THOMAS.